United States Patent [19]

Ohya et al.

[11] Patent Number: 5,060,883
[45] Date of Patent: Oct. 29, 1991

[54] SEAT BELT RETRACTOR

[75] Inventors: Masakiyo Ohya; Atsushi Narue, both of Iwata, Japan

[73] Assignee: Fuji-Autoliv Co., Ltd., Shizuoka, Japan

[21] Appl. No.: 508,888

[22] Filed: Apr. 12, 1990

[30] Foreign Application Priority Data

Apr. 21, 1989 [JP] Japan .................................. 1-103091

[51] Int. Cl.$^5$ ........................................... B65H 75/48
[52] U.S. Cl. .................................................. 242/107
[58] Field of Search ......... 242/107, 107.4 A, 107.4 B, 242/107.4 C, 107.4 D, 107.4 E; 280/806, 807; 297/475, 476, 477, 478

[56] References Cited

U.S. PATENT DOCUMENTS

| | | |
|---|---|---|
| 2,814,504 | 11/1957 | Campbell . |
| 3,206,137 | 9/1965 | Snyderman .................. 242/107.4 B |
| 3,335,974 | 8/1967 | Glauser ........................ 242/107.4 B |
| 3,338,532 | 8/1967 | Board et al. .................. 242/107.4 B |
| 3,493,191 | 2/1970 | Hughes ............................... 242/107 |
| 3,910,625 | 10/1975 | Menard ........................... 242/107 X |
| 4,083,510 | 4/1978 | Gomez ............................... 242/107 |
| 4,159,809 | 7/1979 | Rawson ............................. 242/107 |
| 4,168,810 | 9/1979 | Sack et al. ................. 242/107.4 B X |
| 4,447,017 | 5/1984 | Inukai ............................ 242/107 X |

FOREIGN PATENT DOCUMENTS

| | | |
|---|---|---|
| 7315735 | 4/1973 | Fed. Rep. of Germany . |
| 7321711 | 6/1973 | Fed. Rep. of Germany . |
| 2242523 | 3/1974 | Fed. Rep. of Germany . |
| 3313189 | 10/1984 | Fed. Rep. of Germany . |
| 3402245 | 7/1985 | Fed. Rep. of Germany . |
| 1118245 | 3/1967 | United Kingdom . |

Primary Examiner—John M. Jillions
Attorney, Agent, or Firm—Thomas, Kerr & Kayden

[57] ABSTRACT

The seat belt retractor comprises a frame; a drum rotatably supported by the frame to wind up the seat belt therearound; an emergency lock mechanism; and a seat belt take-up mechanism including, in particular a coiled spring for applying a take-up force to the seat belt. Since a coiled spring is used to apply a take-up force to the seat belt, the take-up torque can be simply determined by changing the diameter of the coiled spring and the number of turns, without increasing the outer diameter of the coiled spring, thus improving the binding feeling of the seat belt to the driver. Further, the coiled spring is excellent in durability, low in cost and small in size as compared with the conventional flat spiral spring.

4 Claims, 3 Drawing Sheets

SEAT BELT RETRACTOR

BACKGROUND OF THE INVENTION

1. Field of the Invention

The present invention relates to a seat belt retractor and more specifically to a seat belt retractor which can increase the durability and the seat belt take-up strength and decrease the cost thereof.

2. Description of the Prior Art

At present, the performance of automotive vehicles have been improved more and more, and further the driver must legally wear a seat belt on his body to ensure driver's safety. Therefore, there exists a strong demand for improvement of the seat belt. A seat belt retractor constitutes an essential portion of the seat belt, and generally provided with a drum rotatably supported by a frame, for winding a seat belt around the outer circumference thereof; an emergency lock mechanism disposed on one side of a drive shaft of the drum, for stopping seat belt let-out motion from the drum at an emergency; and a seat belt take-up mechanism disposed on the drive shaft of the drum, for always applying a return force to the seat belt via the drum.

In the above-mentioned construction, the emergency lock mechanism for stopping seat belt let-out motion at an emergency to ensure driver's safety has been improved widely, and a number of mechanisms have been proposed.

However, the seat belt take-up mechanism for always applying a return force to the seat belt has not been improved, in spite of the fact that this mechanism contributes to the feeling of the seat belt user, because this mechanism does not directly relate to the safety improvement.

Conventionally, a flat spiral spring G as shown in FIG. 1(A) has been used as the take-up force applying means of the seat belt take-up mechanism which exerts an influence upon the feeling of the seat belt user. This flat spiral spring G is manufactured by winding a thin strip-shaped spring material into a spiral shape. Therefore, since there inevitably exist edge portions e along the longitudinal direction thereof as shown in FIG. 1(B), there exists a problem in that internal stress will be concentrated to the edge portions e of the flat spiral spring G when the seat belt is being used and therefore the spring G is often broken, so that the durability of the spring G is not sufficiently long.

To overcome the above-mentioned problem, a method of chamfering the edge portions e has been proposed. However, this method increases the manufacturing cost thereof and further it is difficult to obtain a uniform quality. In addition there exists another problem in that the diameter of the flat spiral spring G inevitably increases with increasing take-up torque for the seat belt.

SUMMARY OF THE INVENTION

With these problems in mind, therefore, it is the primary object of the present invention to provide a seat belt retractor long in life, small in size and low in cost.

To achieve the above-mentioned object, the seat belt retractor, according to the present invention, having: a frame (12); a drum (D) rotatably supported by said frame, for winding up the seat belt (10) therearound; an emergency lock mechanism (30) disposed on one side of said drum, for stopping let-out motion of the seat belt at an emergency; and a seat belt take-up mechanism (20) disposed on the other side of said drum, for applying a take-up force to the seat belt via said drum, is characterized in that said seat belt take-up mechanism comprises a coiled spring (21) as means for applying a take-up force to the seat belt.

Further, it is preferable that said seat belt take-up mechanism further comprises: (a) a cylindrical spool (22) pressure fitted to a drum shaft (11) of said drum; and (b) a cylindrical spring cover (23) fixed to one side surface of said frame, for covering said coiled spring elastically interposed between said cylindrical spool and said cylindrical spring cover.

In the seat belt retractor according to the present invention, since a coiled spring is used as take-up torque applying means of the seat belt take-up mechanism, it is possible to freely determine the torque of the coiled spring by changing the diameter of the coiled spring and the number of turns, without increasing the outer diameter of the coiled spring. As a result, it is possible to improve the binding feeling of the seat belt against the driver (which is caused when the seat belt is attached to the driver's body) and also to improve the comfortability of the driver during vehicle driving, because the seat belt will not prevent the driver's motion. Further, the seat belt take-up mechanism can be increased in durability and decreased in cost and size, as compared with conventional seat belt retractors.

BRIEF DESCRIPTION OF THE DRAWINGS

The features and advantages of the seat belt retractor according to the present invention will be more clearly appreciated from the following description taken in conjunction with the accompanying drawings.

DETAILED DESCRIPTION OF THE PREFERRED EMBODIMENT

Figure 1A:
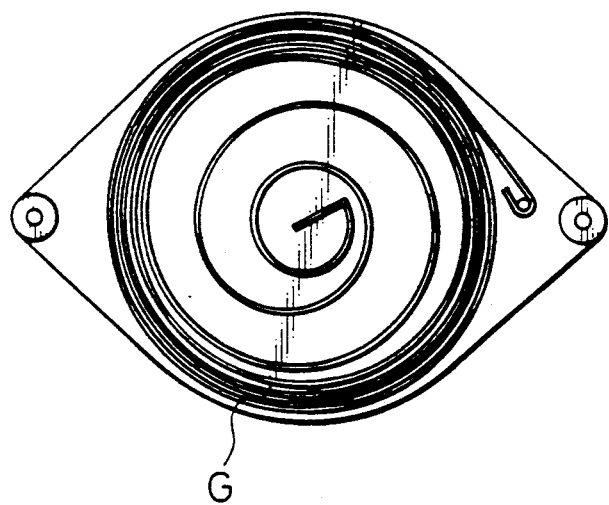
FIG. 1(A) is a plan view showing a prior-art flat spiral spring housed within a retractor casing.

The present invention will be explained hereinbelow on the basis of an embodiment shown in the drawings.

Figure 2:
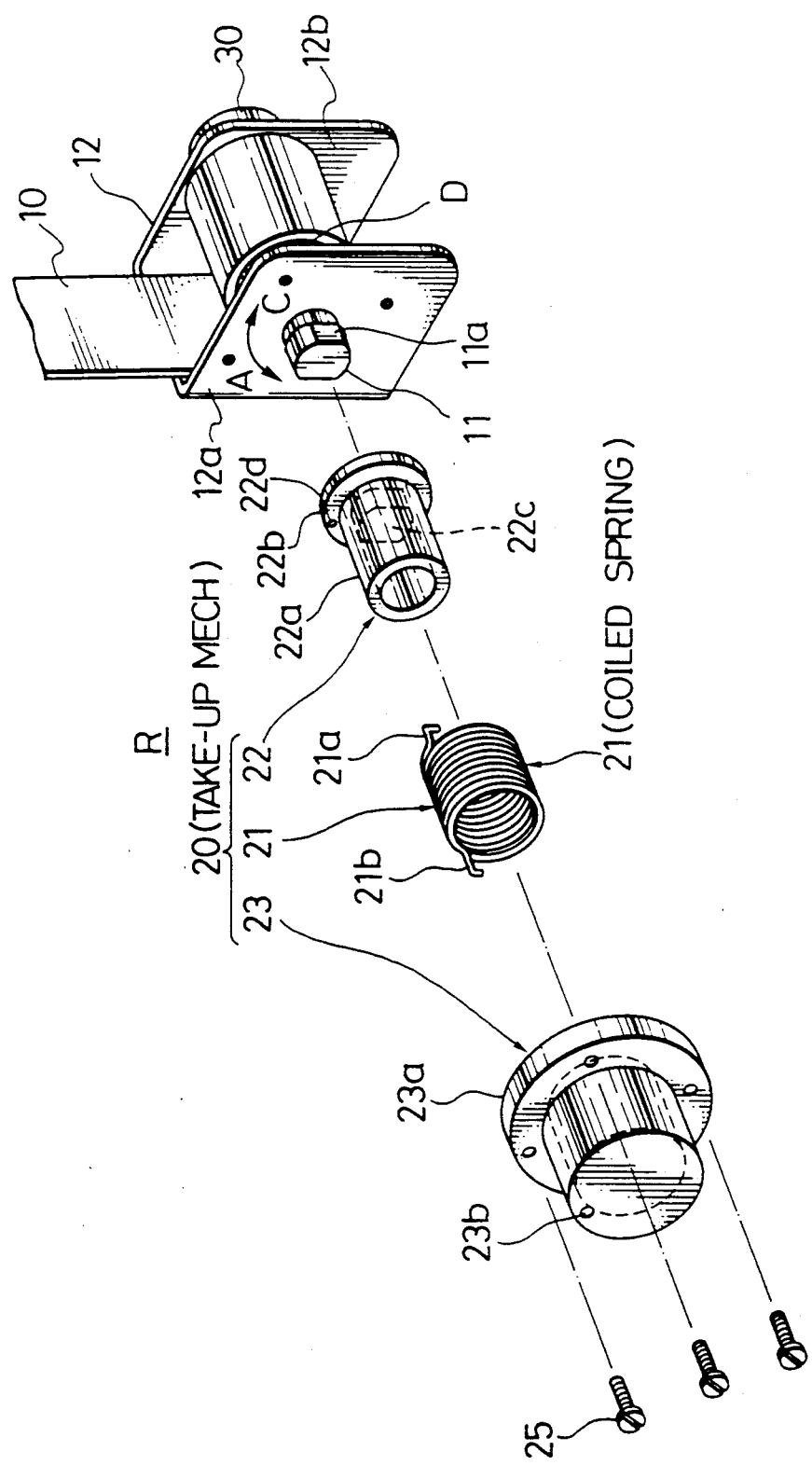
FIG. 2 is an exploded view showing the essential portion of the seat belt retractor according to the present invention.
Figure 3:
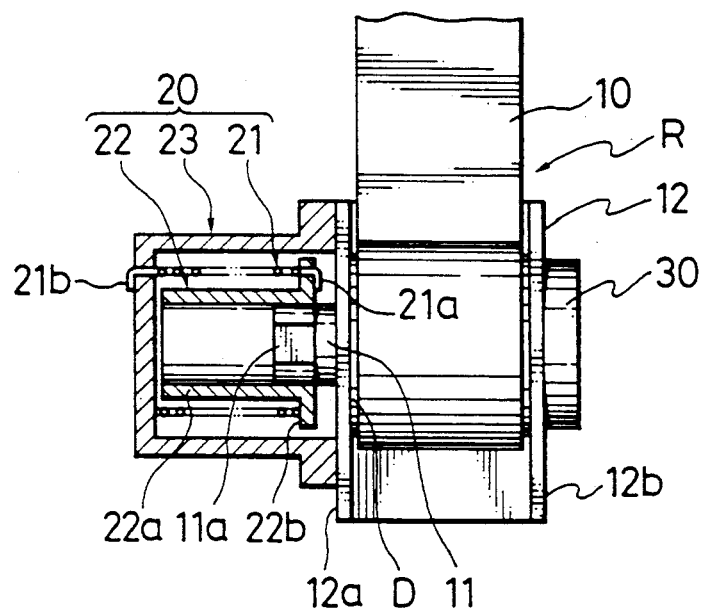
FIG. 3 is a longitudinal partial cross-sectional view showing the essential portion of the seat belt retractor shown in FIG. 2.

FIGS. 2 and 3 show an embodiment of the present invention, in which FIG. 2 is an exploded view showing the essential portion of the seat belt retractor and FIG. 3 is a partial longitudinal cross-sectional view showing the same seat belt retractor.

In the drawings, a seat belt retractor R comprises a drum D rotatably supported by a frame body 12 to wind up a seat belt 10 around the outer circumference of the drum D; an emergency lock mechanism 30 disposed on one side of a drive shaft 11 of the drum D to stop the let-out movement of a seat belt 10 via the drum D at an emergency occurrence; and seat belt take-up mechanism 20 disposed on the other side of the drive shaft 11 of the drum D to always apply a take-up force to the seat belt 10 via the drum D.

In the present invention, in particular, a coiled (or helical) spring 21 is used as means for applying a take-up force to the seat belt in the seat belt take-up mechanism 20.

The construction thereof will be described in further detail hereinbelow.

The drive shaft 11 is rotatably supported by two opposing side surfaces 12a and 12b of the U-shaped frame body 12 in such a way that the axial movement of the drive shaft 11 is restricted and both the ends of the drive shaft 11 project outward from the two opposing side surfaces 12a and 12b. The drum D is fixed to this drive shaft 11 within the frame body 12, and the seat belt 10 is wound around the drum D.

The seat belt take-up mechanism 20 comprises a spool 22, a coiled spring 21 serving as take-up force applying means, and a cover 23. The spool 22 is formed with a cylindrical spool shaft 22a and a flange portion 22b formed at the base portion of the shaft 22a. A slot 22c formed in the inner circumferential surface of the spool shaft 22a is pressure fitted to two cutout portions 11a formed at an end of the drive shaft 11. The cover 23 is formed into a cylindrical shape having a bottom and a flange portion 23a at the base portion thereof. The flange portion 23a of this cover 23 is fixed to one side surface 12a of the frame body 12 with bolts so as to cover the coiled spring 21 and the spool 22. The coiled spring 21 is wound and disposed around the spool shaft 22a in such a way that one end 21a thereof is fitted to a hole 22d formed in the flange portion 22b of the spool 22, and the other end thereof 21b is fitted to another hole 23b formed in the bottom of the cylindrical cover 23, respectively. Therefore, the drum D is always urged by this coiled spring 21 via the drive shaft 11 in a direction that the seat belt is wound or taken up in the arrow direction A to always apply a take-up force to the seat belt 10. Further, since the emergency lock mechanism 30 is essentially the same as the conventional structure, the detailed description thereof is omitted herein.

The operation of the embodiment of the present invention will be described hereinbelow.

When the driver wears the seat belt 10, the seat belt 10 is pulled by the driver. Then, since the drive shaft 11 is rotated in the direction C together with the spool 22 via the drum D, the external diameter of the coiled spring 21 is reduced, so that a seat belt take-up force is stored in the coiled spring 21. After the seat belt 10 has been attached about the driver and released, since the drum D is rotated together with the drive shaft 11 via the spool 22 by a return force of the coiled spring 21 in the arrow direction A, the seat belt 10 is taken up around the drum D so that the seat belt 10 is fitted to the driver's body without producing looseness. In case an emergency state occurs, since the emergency lock mechanism 30 is actuated, the seat belt 10 is stopped from being further let-out so that the driver's body is held at a safe position.

Figure 1B:
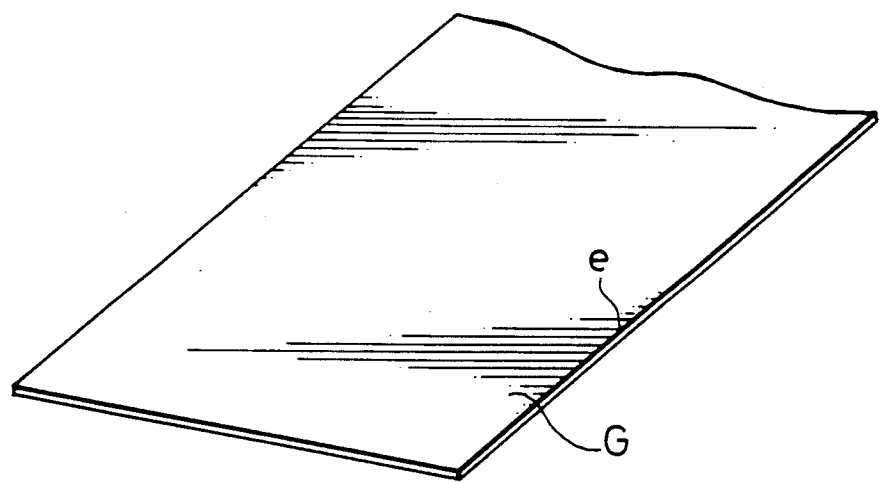
FIG. 1(B) is an enlarged perspective view showing a developed prior-art flat spiral spring.

In the seat belt take-up mechanism 20, since the coiled spring 21 (take-up force applying means) is formed with no edge portions, being different from the conventional flat spiral spring G, it is possible to prevent internal stress from being concentrated at the edge portions e (shown in FIG. 1(B)), so that the durability of the spring can be improved markedly. In addition, since special processes such as chamfering processing, annealing treatment, etc. are not required, it is possible to reduce the cost of the spring. Further, since the strength or torque of the coiled spring 21 can be increased by simply changing the coil diameter and the number of turns of the coiled spring 21, without increasing the outer diameter of the spring, it is possible to freely determine the strength of the coiled spring 21 sufficiently.

As described above, in the seat belt retractor according to the present invention, since a coiled spring is used as the seat belt take-up force applying means, it is possible to freely determine the strength of the coiled spring sufficiently by simply designing the coil diameter and the number of turns of the coiled spring, without increasing the outer diameter thereof. As a result, it is possible to reduce the binding feeling of the driver when the driver wears the seat belt and improve the driver's comfortability during driving without restricting the driver's motion. Further, the seat belt retractor according to the present invention is long in durability, low in cost and small in size, as compared with the seat belt take-up mechanism of conventional seat belt retractors.

What is claimed is:

1. A seat belt retractor for retracting a seat belt, having:
    a frame;
    a drum having a drum shaft and rotatably supported within said frame on said drum shaft extending through said frame, for winding up the seat belt therearound;
    an emergency lock mechanism disposed on one side of said drum, for stopping let-out motion of the seat belt in an emergency; and
    a seat belt take-up mechanism disposed outside of said frame on the other side of said drum opposite from said emergency lock mechanism, for applying a take-up force to the seat belt via said drum, wherein said seat belt take-up mechanism comprises a helical coiled spring as means for applying a take-up force to the seat belt, a cylindrical spool pressure fitted to said drum shaft outside of said frame, and a cylindrical spool cover mounted to an outside side surface of said frame covering said helical coiled spring to retard deformation of said helical coiled spring said coiled spring elastically interposed between said cylindrical spool and said cylindrical spring cover.

2. The seat belt retractor of claim 1, and wherein said cylindrical spool comprises:
    a flange portion pressure fitted to said drum shaft of said drum and a shaft portion on which said coiled spring is mounted.

3. A seat belt retractor for retracting a seat belt, comprising:
    a frame body having opposed side surfaces
    a drum mounted upon a drum shaft within said frame body for winding the seat belt therearound, with said drum shaft extending through said frame body and projecting outwardly from said side surfaces of said frame body;
    an emergency lock mechanism mounted to one side surface of said frame body, for stopping the let-out motion of the seat belt in an emergency; and
    a seat belt take-up means disposed on the other side surface of said frame body opposite said emergency lock mechanism, outside of said frame body on the opposite side of the side surface from said drum, for applying a take-up force to the seat belt via said drum;
    said take-up means including a cylindrical spool pressure fitted to said drum shaft of said drum, outside of one of said side surfaces of said frame body, so as to be rotatable with said drum shaft, a cylindrical spring cover attached to said side surface of said frame body covering said cylindrical spool with said cylindrical spring cover spaced apart from said cylindrical spool to thereby form an annular space between said cylindrical spool and said cylindrical spring cover, and a helical coiled spring elastically interposed within said annular space between said cylindrical spool and said cylindrical spring cover.

4. The seat belt retractor of claim 3 and wherein said cylindrical spool includes a shaft on which said coiled spring is mounted, a flange portion at one end of said shaft and a slot formed in the end of said shaft adjacent said flange portion for receiving said drum shaft of said drum to form a pressure fit between said cylindrical spool and said drum shaft.

* * * * *